United States Patent [19]

Schuck et al.

[11] Patent Number: 4,701,757

[45] Date of Patent: Oct. 20, 1987

[54] CONTROL SYSTEM FOR PRINTING MACHINES

[75] Inventors: Helmut Schuck, Coswig; Karl-Heinz Foerster, Dresden; Monika Kuehn, Meissen; Klaus Schanze, Coswig, all of German Democratic Rep.

[73] Assignee: Veb Kombinat Polygraph "Werner Lamberz" Leipzig, Leipzig, German Democratic Rep.

[21] Appl. No.: 835,258

[22] Filed: Feb. 27, 1986

[30] Foreign Application Priority Data

Feb. 27, 1985 [DD] German Democratic Rep. ... 273587

[51] Int. Cl.[4] ........................ H04Q 9/00; G05B 23/02

[52] U.S. Cl. .............................. 340/825.06; 346/33 R

[58] Field of Search ...................... 340/825.06; 178/36, 178/3, 4, 23 R; 346/140 R, 75, 105, 33 R, 44, 52, 1.1; 364/518, 519

[56] References Cited

U.S. PATENT DOCUMENTS 4,393,386 7/1983 DiGiulio ................................ 346/75
4,608,575 8/1986 Morgan .................................. 346/75

FOREIGN PATENT DOCUMENTS 160303 6/1983 German Democratic Rep. .

*Primary Examiner*—Donald J. Yusko
*Attorney, Agent, or Firm*—Michael J. Striker

[57] ABSTRACT

A control system for controlling a plurality of subprocess means, for example adjustment drives for ink zone adjusting screws in a plurality of modes of operation. The control system includes an input device, a start device and a number of control subsystems arranged in groups and connected to respective selection systems. The latter are in turn connected to a main control selection circuit which is in connection with the start device. Each group of the control subsystems and each group of the control selection circuits are connected via a first control code bus and a second control code bus, respectively, to the main control selection circuit.

10 Claims, 7 Drawing Figures

CONTROL SYSTEM FOR PRINTING MACHINES

BACKGROUND OF THE INVENTION

The present invention pertains to a control system for printing machines.

A control system of the type under consideration has been designed for controlling a plurality of sub-processes or proceedings of, for example adjustment drives of ink zone adjusting screws in various modes of operation, for example, the whole adjustment, a group adjustment, an individual adjustment, segregation, etc.

A control mechanism for an ink zone adjustment in printing machines, disclosed in DD No. 160,303 includes adjustment drives, a control element-operation mode switch, a printing mechanism switch, a control element for each adjustment drive, control elements for group or whole adjustments, and a control circuit for processing signals received from the control elements and controlling individual adjustment drives. The control mechanism is formed as a matrix, in the intersection point of which a switching relay for the adjustment drive is positioned, whereby the conduit carrying the information about the adjustment represents the cells and the conduit with the information about the printing mechanism represents the gaps of the matrix.

The disadvantage of the known control mechanism is its complexity; in other words, in order to realize a succession of the operation modes a higher technical expense is involved, and it is impossible to expand control functions without substantially changing all the circuits.

SUMMARY OF THE INVENTION

It is an object of the present invention to provide an improved control system for printing machines.

It is another object of the invention to provide an inexpensive control system for printing machines.

Yet another object of the present invention is to provide a system with a hierarchie order of the operation modes.

These and other objects of the invention are attained by a control system for printing machines for controlling a plurality of subprocess means (5) in a plurality of modes of operation, comprising an input device (4) and a start device (17) an input data bus (1) and an output data bus (2) each being connected to said subprocess means; a key board data bus (3); a plurality of control subsystems (6) arranged in groups, each control subsystem being connected via said input data bus and output data bus to said sub-process means and via said keyboard data bus to said input device; first control code buses (16), second control code buses (11), a plurality of control selection circuits arranged in groups and each assigned to a group of said control sybsystems, each group of said control subsystems being connected via a respective first control code bus, and each group of said control selection circuits being connected directly via a second control code bus or indirectly via further groups of further control selection circuits and further control code buses, at an input side, with a main control selection circuit (12) connected to said start device; preferential conduits (15) and actuation conduits (14), said main control selection circuit being connected via at least one control selection circuit with one control subsystem of one group while remaining control subsystems with acutation conduits are connected via at least one control selection system to said main control selection system.

Each control subsystem (6) may include a code control circuit (9) connected at an input side thereof with the keyboard code bus and at an output side thereof with the first control code bus, a process control subsystem (8), an end treatment conduit (18), an intermediate control code bus (16), and a final information conduit (19), said process control subsystem being connectable at one input thereof with the preferential conduit or the actuation conduit, and at the other input thereof with said input data bus, and at an input thereof with said output data bus, and via said end treatment conduit, said intermediate control code bus and said final information conduit with said code control circuit.

Each control selection circuit (7) may include a code control circuit (9) connected at an input thereof with the first control code bus (10) and at an output thereof with the second control code bus (11), a selection circuit (13), an end treatment conduit (18) a final information conduit (19), and an intermediate control code bus (16), said selection circuit (13) being connectable at an input thereof with the preferential conduit or the actuation conduit and at an output thereof being connected with an assigned control subsystem (6) via the preferential conduit and the actuation conduit, and via said end treatment conduit, said final information conduit and said intermediate control code bus to said code control circuit.

The main control selection circuit (12) may include a code control circuit (9) connected at an input thereof with the second control code bus (11), a selection circuit (13) connected at an input thereof with said start device (17) and at an output thereof via the preferential conduit and the actuation conduit with assigned control selection circuits (7), and end treatment conduit (18), a final information conduit (19) and an intermediate control code bus (16), said selection circuit being connected by said end treatment conduit, said final information conduit and said intermediate control code bus to said code control circuit.

The code control circuit (9) may include a first gate circuit (21) connectable at an input side thereof with the keyboard code bus (3) or with the first control code bus (10) or with the second control code bus (11), a second gate circuit (22), a first decoder circuit (23), and a negator (24), an output of said first decoder circuit being connected to the end treatment conduit (18), an output of said first gate circuit being connected to the intermediate control code bus (16), a second input of said first gate circuit being connected via said negator to the output of said first decoder circuit, and an output of said second gate circuit being connectable with the first control code bus (10) or with the second control code bus (11), a second input of said second gate circuit being connected with said final information conduit (19).

The selection circuit (13) may include a second decoder circuit (33) connected at an input thereof with the intermediate control code bus (16), a buffer storage (32) connected at an input thereof with the intermediate control code bus (16) and the end treatment conduit (18) and with an output of the second decoder circuit, a third decoder circuit (36) connected in series with said buffer storage (32) and connectable at an input thereof with the preferential conduit (15) or with the actuation conduit (14) and at an output thereof with a monoflop (34) connected to the buffer storage (32), and a third And gate (38) connected at an output thereof with the final information conduit (19) and at an input side thereof with said monoflop and said buffer storage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompany drawing.

DETAILED DESCRIPTION OF THE PREFERRED EMBODIMENTS

Figure 1:
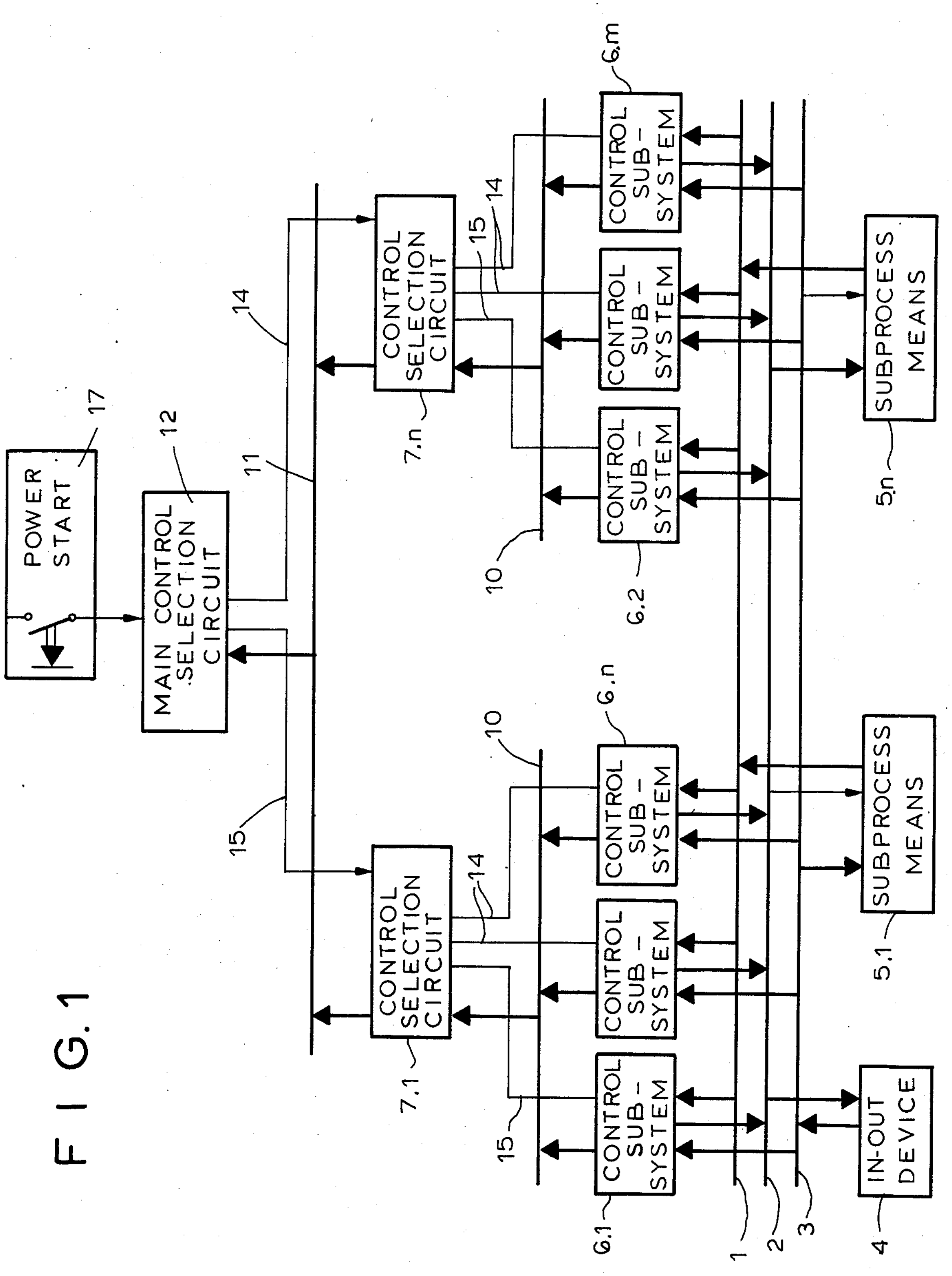
FIG. 1 is a block circuit diagram of a control system for printing machines, in accordance with the invention.

Referring now to the drawings in detail, a control system shown in FIG. 1 comprises an input data bus 1, an output data bus 2 and a keyboard code bus 3.

An input device 4, for example an alpha-numeric and function keyboard is connected with the output data bus 2 and the keyboard code bus 3.

Control subsystems 6 which represent a lower control plane are connected with the input data bus, output data bus and the keyboard code bus and the control subsystems 6 are combined in groups 6.1 to 6.n and 6.2 to 6.m; the groups can correspond to respective buses. The number of control subsystems in each group is not limited.

All control subsystems 6 of one group are assigned via a first control code bus 10 to a control selection circuit 7 which represents a higher control plane. All control selection circuits 7, which may not be combined in groups, are assigned, via a second control code bus 11, to a main control selection circuit 12 which represents an upper control plane. If necessary further control circuits can be utilized.

If a respective control output is required and the control selection circuits 7 are subdivided into groups the connection of the control selection circuits 7 with the main control selection circuit 12 is carried out via further groups of such control selection groups 7.

Figure 2:
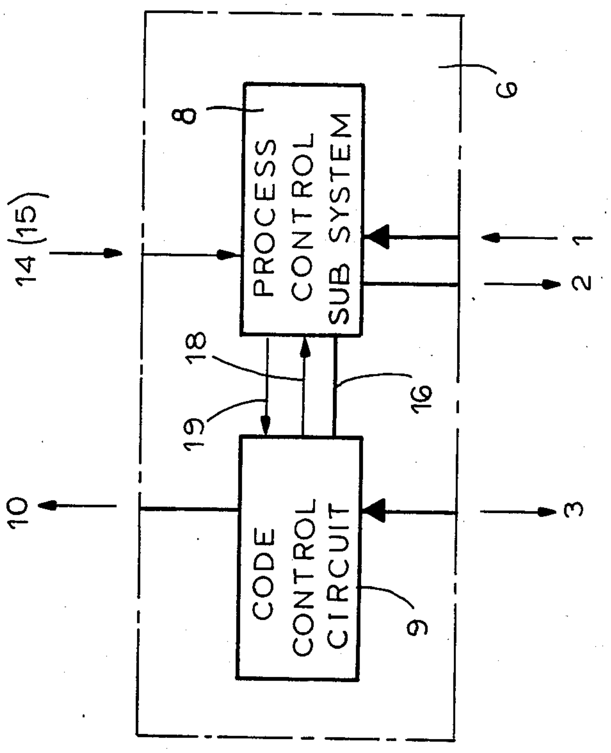
FIG. 2 is a block diagram of the individual control subsystem

The main control selection circuit 12 is connected at one side thereof with a starting device 17. The output side of the main selection control circuit is connected by means of a preferential line or conduit 15 and/or a plurality of actuation conduits 14 with the control subsystems 6. Each control subsystem 6 includes a code control circuit 9 and a process control subsystem 8 as shown in FIG. 2.

Figure 3:
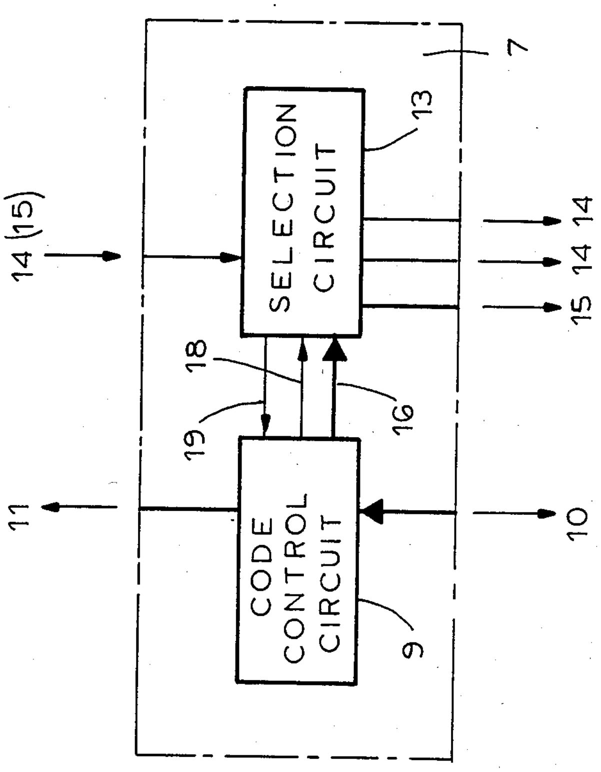
FIG. 3 is a block diagram of the control selection circuit.
Figure 5:
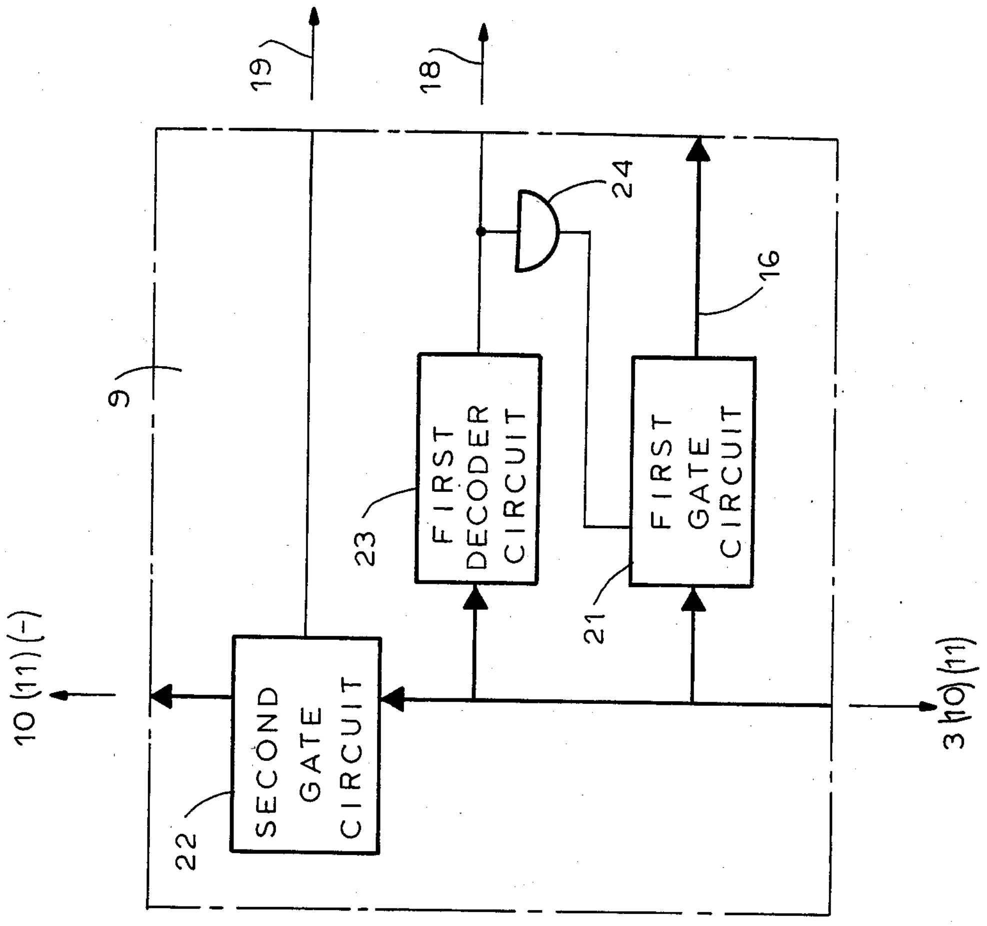
FIG. 5 is a block diagram of a code control circuit.
Figure 4:
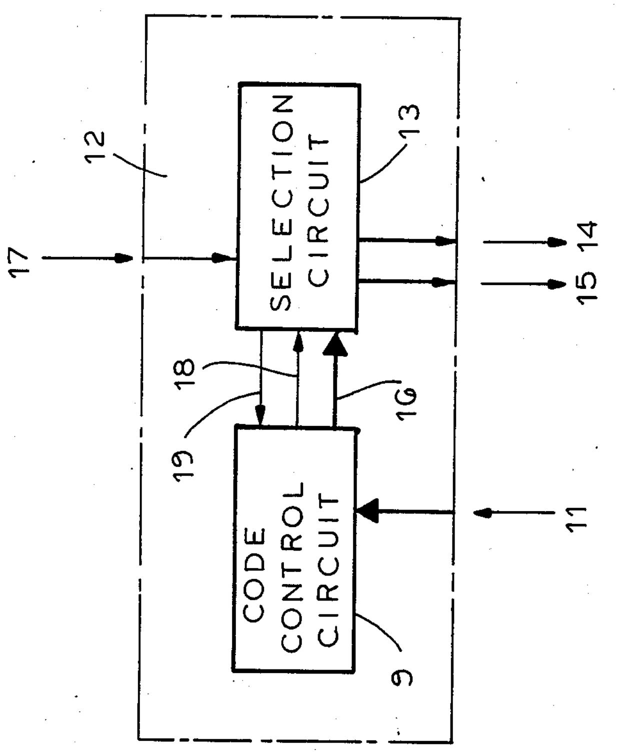
FIG. 4 is a block diagram of the main control selection circuit.

As shown in FIG. 3 each control selection circuit 7 includes a code control circuit 9 and a selection circuit 13. The code control circuit in the control subsystem 6, in the control selection circuit 7 and in the main control selection circuit 12 is of the same construction which is shown in FIG. 5. The code control circuit 9 is comprised of a first gate circuit 21, a second gate circuit 22, a first decoder circuit 23 and a negator 24.

The first gate circuit 21, the second gate circuit 22 and the first decoder circuit 23, in the event that the code control circuit 9 is arranged in the control subsystem 6, are connected at the input side, with the keyboard code bus 3 and, at the output side, with the first control code bus 10 whereas, in the event when the code control circuit 9 is arranged in the control selection circuit 7, the gate 21, gate 22 and decoder circuit 23 are connected, at the input side, with the first control code bus 10 and at the output side, with the second control code bus 11. If the code control circuit 9 is arranged in the main control selection circuit 12 circuit 9 is connected, at its input side, with the second control code bus 11 and has no connection with any other element at the output side. Furthermore, the first gate circuit 21 at the output side is connected to an intermediate control code bus 16.

The first decoder circuit 23 is in turn connected at the output side with an end treatment line 18 and, via the negator 24, with the input of the first gate circuit 21.

The second gate circuit 22 is connected with an end final information line 19. The gate circuits and decoder circuits are formed in the known fashion and are commercially available circuits.

The process control subsystem 8 shown in FIG. 8 comprises a first operation control circuit 25, a second operation control circuit 26, a common or general control circuit 27 and a first AND gate 28 and a second AND gate 29.

The first operation control circuit 25, the second operation control circuit 26 and the common control circuit 27 are connected at the input side with the input data bus 1 and at the output side with the output data bus 2.

The first operation control circuit 25 at the input side is connected directly with the preferential line 15 or with the actuation line 14 while the second operation control circuit 26 is connected to line 14 or line 15 via the first AND gate 28. This connection takes place in accordance with the position of the control subsystem 6, in which the process control subsystem is arranged in the control system.

The first operation control circuit 25 is also connected at the output side with the input of the common control circuit 27. The second input of the first AND-gate 28 is formed by the end treatment line 18; the output of the first AND gate 28 is also connected with the second operation control circuit 26 and with the common control circuit 27. The latter is further connected at the input side with the intermediate control code bus 16.

The second AND gate 29 is in connection at the input side thereof with the second operation control circuit 26 and with the preferential line 15 or the actuation line 14 and at the output side thereof with the end final information line 19.

The operation control circuits are formed as stepping mechanisms. The common control circuit comprises all the elements which are necessary to control the subprocess means 5 in accordance with specific switching conditions. The simplest manner of such a control is if the common control circuit includes a relay.

Figure 7:
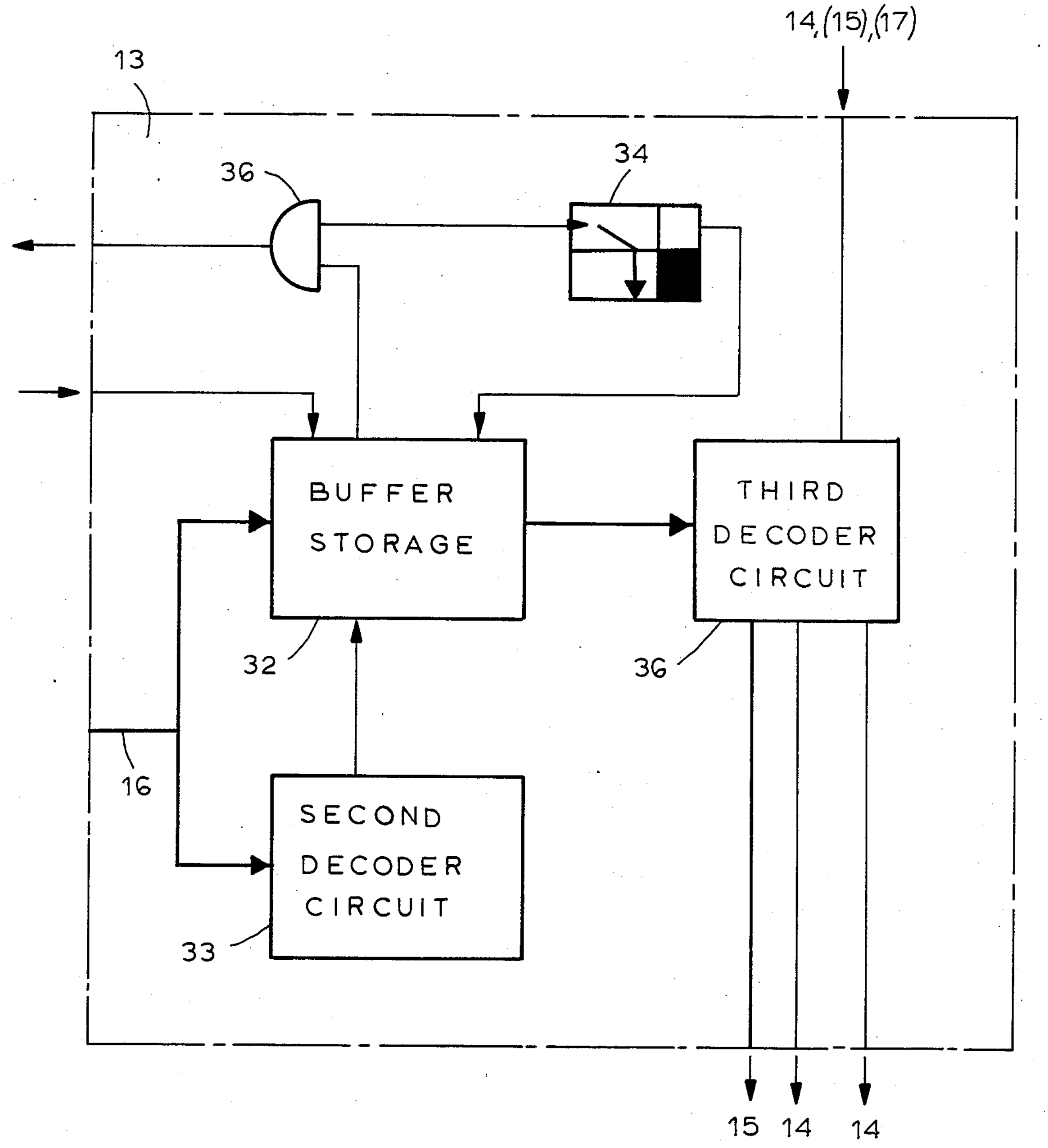
FIG. 7 is a block diagram of a selection circuit.

FIG. 7 illustrates in greater detail the selection circuit 13 arranged in the control selection circuit 7 and in the main control selection circuit 12. The selection circuit 13 includes a buffer storage 32, a second decoder circuit 33, a third decoder circuit 36, a monoflop unit 34 and a third AND gate 38. The buffer storage and the second decoder circuit 33 are, at the output side, connected with the intermediate control code bus 16 whereby the buffer storage 32 is connected in series with a second decoder circuit 33, and the third decoder circuit 36 is connected in series with the buffer storage 32.

The buffer storage 32 in turn is connected at its input side with the end treatment conduit 18. The monoflop 34 and the third AND gate 38 are connected at their input side, in the case when the selection circuit 13 is arranged in the control selection circuit 7, with the preferential conduit 15 or actuation conduit 14, and, in the case when the selection circuit 13 is arranged in the main control selection circuit 12, with the start device 17. On the other hand, the monoflop 34 is connected at its output side with the buffer storage 32. The second input of the third AND gate 38 is a turn connected with the buffer storage 32 while its output is connected with the end final information conduit 19.

The mode of operation of the control system of this invention is as follows:

The system starts operation upon the actuation of the start device 17. This actuation can be obtained, for example by plugging into the network. The start signal controls the selection circuit 13 in the main control selection circuit 12 which is positioned as mentioned above in the upper control plane. The selection circuit 13 actuates the preferential conduit 15 which controls the selection circuit 13 in the control selection circuit 7 in the next lower control plane. This process is repeated until the process control subsystem 8 is obtained in the control subsystem 6 which is thereby actuated and takes over the process control.

Then the other control subsystem 6 can be selected by the function control keys in the input device 4. This input device 4 thus, upon the actuation of the function keys, issues a keyboard code which reaches, via the keyboard code bus 3, the directly actuated control subsystem 6. If the keyboard code is comprised, for example of eight bits, then, for example four bits of higher value for addressing the control plane are used as well as four bits of lower value for addressing the preferential conduit 15 or the actuation conduits 14. In the first code control circuit 9 of the control subsystem 6, the keyboard code is analyzed for the first time.

Two variants are possible as follows:

Variant I:

The keyboard code carries no address of the high control plane. The code control circuit 9 transmits a keyboard code directly through the intermediate code bus 16 to the process control subsystem 8 which releases corresponding control signals for controlling the subprocess means 5.

Variant II:

The keyboard code carries the address of the higher control plane. In this case, the code control circuit 9 actuates the process control subsystem 8 via the end treatment conduit 18. The process control system 8 carries out all the functions for a further transmittion of the keyboard code. If these functions are terminated the code control circuit 9 is actuated by the end final information conduit 19. The code control circuit transmits the received keyboard code via the first control code bus 10 further to the control selection circuit 7 in the following higher control plane. If the keyboard code reaches the code control circuit 9 in the control selection circuit 7 two variants are to be distinguished from each other.

The keyboard code carries no address of the higher control plane but rather the address in which the control selection circuit 7 is positioned. In this instance, the keyboard board code is transmitted via the intermediate code bus 16 to the selection circuit 13 and the selection circuit takes over all the functions for controlling respective process subsystems for which the keyboard code has been defined.

The keyboard code carries the address of yet even higher control plane, for example the upper control plane. In this case, the keyboard code will be transmitted, as described above, from the code control circuit 9 to the selection circuit 13 and back to the code control circuit 9 and from there to the second control code bus 11 and then to the main control selection circuit 12 in the next higher control plane, that is the upper plane and then the signal will be processed further.

Now the fashion of operation of the control system will be described in greater detail:

If a new keyboard code is applied to the keyboard code bus 3 this code will be evaluated in the first decoder circuit 23 of the code control circuit 9 of the control subsystem 6 (FIG. 5), that is this code will be examined on whether the code is determined for the lower or the higher control plane.

Figure 6:
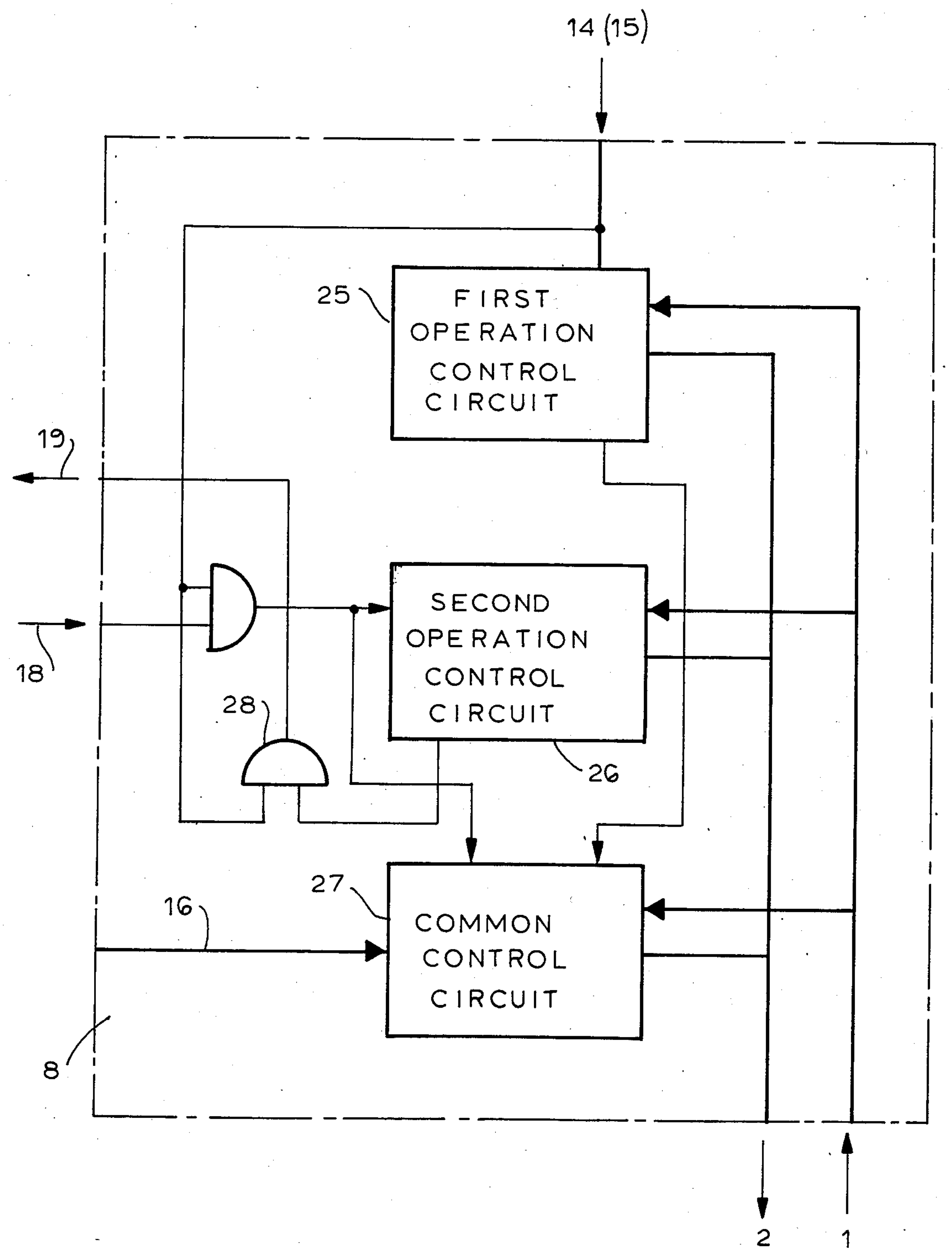
FIG. 6 is a block diagram of a process control subsystem.

If the keyboard code is not determined for the higher control plane the end treatment conduit remains inactive and the first gate circuit 21 receives via the first negator 24 an active signal whereby the applied keyboard code bus is directly transmitted via the intermediate control code bus 16 to the common control circuit 27 of the process control subsystem 8 (FIG. 6). The common control circuit 27 now takes over the control of the subprocess means 5 in accordance with the content of the keyboard code.

If a new keyboard code is determined for a higher control plane the end treatment conduit 18 is actuated whereby the first gate circuit 21 is locked by the first negator 24. At the same time, the second operation control circuit, which can be, for example a stepping mechanism or a control switch mechanism, is set in operation to adjust determined ground conditions to the subprocess means 5. Then the final information conduit 19 is actuated and the second gate circuit 22 opens whereby the new keyboard code is transmitted to the highest control selection circuit 7 which carries out a further evaluation of the received code. The first AND gate 28 has the function of preventing the start of the second operation control circuit 26 in the process control subsystem 8 which is not controlled by the active signal in the preferential conduit 15 or actuation conduit 14. The second AND gate 29 precludes that the process control subsystem 8 can issue a final signal which is not controlled by the actuated actuation conduit 14 and usually would bring a further transmission of the actual keyboard code to the correct control selection circuit 7.

This evaluation is obtained again in the code control circuit 9 of the control selection circuit 7 in the analogous manner, that is when the keyboard code is not determined for the higher control plane the end treatment conduit 18 remains inactive and when the keyboard code for the higher control plane is, in fact, determined the end treatment conduit 18 is actuated.

With the inactive end treatment conduit 18, the first gate circuit 21 of the code control circuit 9 of the control selection circuit 7 transmits an active signal via the first negator 24 whereby the applied keyboard code is directly transmitted via the intermediate control code 16 to the third decoder circuit 33 of the selection circuit 13 (FIG. 7).

The applied new keyboard code is processed in the buffer storage 32, transmitted to the third decoder circuit 36 and then a new preferential-actuation conduit 15, 14 is switched on.

With the active end treatment conduit 18, the buffer storage 32 is reset, and the code in the third decoder circuit 36 is transmitted for switching off all the preferential and actuation conduits 15, 14.

After the above described steps, the final information conduit 19 is actuated and the second gate circuit 22 of the code control circuit 9 of the control selection circuit 7 opens, whereby the new keyboard code is delivered to the upper control plane, e.g. to the main control selection circuit 12 which carries out a further evaluation.

The processing of the keyboard code received from the control selection circuit 7 takes place in the main control selection circuit 12 by the code control circuit 9 and the selection circuit 13 in the above described fashion, that is when the intermediate control code bus 16 between the code control circuit 9 and the selection circuit 13 of the main control selection circuit 12 is converted from a signal-releasing to a signal-transmitting condition this will be recognized by the second decoder circuit 33, and the new applied keyboard code will be received in the buffer storage 22 and further transmitted to the third decoder circuit 36, and a new preferential or actuation conduit 15, 14 will be switched on.

In the instance when, upon the issuance of a signal by the start device 17, the conduit between the start device 17 and the selection circuit 13 of the main control selection circuit 12 is converted to the active position the monoflop 34 delivers via a setting conduit on the buffer storage 32 a setting pulse which issues a code for setting the preferential conduit 15 at the third decoder circuit 36.

At the start of the third decoder circuit 36 of the selection circuit 13 (FIG. 7) of the main control selection circuit 12, now a signal condition initiated by the start device 17 or the code control circuit 9 exists, which is transmitte via the preferential conduit 15 or actuation conduit 14 to the selection circuit 13 of the next lower control selection circuit.

The signal displacement in the selection circuit 13 of the control selection circuit 7 is carried out in the analogous manner so that at the output of the third decoder circuit 36, a signal condition initiated either by the start device 17 or the code control circuit 9 of the main control selection circuit 12 or by the code control circuit 9 of the control selection selection circuit 7 will be firstly transferred via the preferential or actuation conduit 15, 14 to the process control subsystem 8 of the control subsystem 6.

In case the prefevential and acutuation conduits 15, 14 are set into the active position the first operation control circuit 25 is set into operation.

The first operation control circuit 25, which can be, for example a switch control mechanism or a stepping mechanism, has the function of converting the subprocess means 5 to a specific output control state. After this has been achieved, the connection conduit between the first operation control circuit and the common control circuit 27 is actuated, and the common control circuit 27 takes over the control of the subprocess means 5 and therewith all its specific control functions.

A specific application of the process control subsystem 8 (FIG. 6) takes place when the function of the common control circuit 27 resides in that, after completion of the operation of the first operation control circuit 25, a control error is transmitted via the output data bus 2 to the input device 4, which error issues a determined new control code and causes a switching on of the new control subsystem 6. The so-designed control subsystem would represent automatic tuning means with an exactly determined control operation without additionally required control manipulations.

Finally, the process control in the control subsystem 6 would take place, in which again the above mention cooperation would exist, which, due to the manipulation of the process or of the input device 4, would release only a predetermined activity. The release of the next activity would deliver either a new control move or a repeating signal.

The advantage of the control system of the present invention resides in that in case of a control problem with many operation modes depending on each other the control can be carried out in a simple manner during the transmission from one operation mode to the other one.

Furthermore, there is a possibility that these operation modes should be arranged in accordance with their succession in the main operation function and underoperation functions, whereby the advanced structure is also arbitrarily broadened.

It will be understood that each of the elements described above, or two or more together, may also find a useful application in other types of control systems for printing machines differing from the types described above.

While the invention has been illustrated and described as embodied in a control system for printing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a control system for printing machines for controlling a plurality of subprocess means (5) and a plurality of modes of operation, including an input device (4) and a start device (17), the improvement comprising an input data bus (1) and an output data bus (2) connected to said subprocess means; a keyboard data bus (3), a plurality of control subsystems (6) arranged in groups, each control subsystems being connected via said input data bush and output data bus to said subprocess means and via said keyboard data bus to said input device; first control code buses (16); second control code buses (11); a plurality of control selection circuits arranged in groups and each assigned to a group of said control subsystems, each group of said control subsystems being connected via a respective first control code bus, and each group of said control selection circuits being connected directly via a second control code bus or indirectly via further groups of further control selection circuits and further control code buses at an input side with a main control selection circuit (12) connected to said start device; and preferential conduits (15) and actuation conduits (14), said main control selection circuit with preferential conduits being connected via at least one control selection circuit with one control subsystem of one group while remaining control subsystems with actuation conduits are connected via at least one control selection system to said main control selection system.

2. The control system as defined in claim 1, wherein each control subsystem (6) includes a code control circuit (9) connected at an input side thereof with the keyboard code bus and at an output side thereof with the first control code bus, a process control subsystem (8), an end treatment conduit (18), an intermediate control code bus (16), and a final information conduit (19), said process control subsystem being connectable at one input thereof with the preferential conduit or the actuation conduit, and at the other input thereof with said input data bus and at an input thereof with said output data bus, and via said end treatment conduit, said intermediate control code bus and said final information conduit with said code control circuit.

3. The control system as defined in claim 1, wherein each control selection circuit (7) includes a code control circuit (9) connected at an input thereof with the first control code bus (10) and at an output thereof with the second control code bus (11), a selection circuit (13), and end treatment conduit (18) a final information conduit (19), and an intermediate control code bus (16), said selection circuit (13) being connectable at an input thereof with the preferential conduit or the actuation conduit and at an output thereof being connected with an assigned control subsystem (6) via the preferential conduit and the actuation conduit, and via said end treatment conduit, said final information conduit and said intermediate control code bus with said code control circuit.

4. The control system as defined in claim 1, wherein said main control selection circuit (12) includes a code control circuit (9) connected at an input thereof with the second control code bus (11), a selection circuit (13) connected at an input thereof with said start device (17) and at an output thereof via the preferential conduit and the actuation conduit with assigned control selection circuits (7), an end treatment conduit (18), a final information conduit (19), and an intermediate conduit (19) and an intermediate control code bus (16), said selection circuit being connected by said end treatment conduit, said final information conduit and said intermediate control code bus with said code control circuit.

5. The control system as defined in claim 2 wherein said code control circuit (9) includes a first gate circuit (21) connectable at an input side thereof with the keyboard code bus (3) or with the first control code bus (10) or with the second control code bus (11), a second gate circuit (22), a first decoder circuit (23), and a negator (24), an output of said first decoder circuit being connected to the end treatment conduit (18), an output of said first gate circuit being connected to the intermediate control code bus (16), a second input of said first gate circuit being connected via said negator to take output of said first decoder circuit, and an output of said second gate circuit being connectable with the first control code bus (10) or with the second control code bus (11), a second input of said second gate circuit being connected with said final information conduit (19).

6. The control system as defined in claim 3, wherein said code control circuit (9) includes a first gate circuit (21) connectable at an input side thereof with the keyboard code bus (3) or with the first control code bus (10) or with the second control code bus (11), a second gate circuit (22), a first decoder circuit (23), and a negator (24), an output of said first decoder circuit being connected to the end treatment conduit (18), an output of said first gate circuit being connected to the intermediate control code bus (16), a second input of said first gate circuit being connected via said negator to take output of said first decoder circuit, and an output of said second gate circuit being connectable with the first control code bus (10) or with the second control code bus (11), a second input of said second gate circuit being connected with said final information conduit (19).

7. The control system as defined in claim 4, wherein said code control circuit (9) includes a first gate circuit (21) connectable at an input side thereof with the keyboard code bus (3) or with the first control code bus (10) or with the second control code bus (11), a second gate circuit (22), a first decoder circuit (23), and a negator (24), an output of said first decoder circuit being connected to the end treatment conduit (18), an output of said first gate circuit being connected to the intermediate control code bus (16), a second input of said first gate circuit being connected via said negator to the output of said first decoder circuit, and an output of said second gate circuit being connectable with the first control code bus (10) or with the second control code bus (11), a second input of said second gate circuit being connected with said final information conduit (19).

8. The control system as defined in claim 2, wherein each process control subsystem (8) includes a first operation control circuit (25) connected at an input thereof with the input data bus (1) and at an output thereof with the output data bus (2), a second operation control circuit (26) and a common control circuit (27), said first operation control circuit (25) being connectable at its input with a preferential conduit (15) or actuation conduit (14) and at an output thereof with the common control circuit, said second operation control circuit (26) and said common control circuit (27) which is connected at an input side thereof with the intermediate control code bus (16) being connected with an output of a first AND gate, said first AND gate having inputs connectable with the preferential conduit (15) or the actuation conduit (14) and with an end treatment conduit (18), an output of said second operation control circuit (26) being connected via a second AND gate (29) with a final information conduit (19), a second input of said second AND gate being formed by the preferential conduit (15) or the actuation conduit (14).

9. The control system as defined in claim 3, wherein said selection circuit (13) includes a second decoder circuit (33) connected at an input thereof with the intermediate control code bus (16), a buffer storage (32) connected at an input thereof with the intermediate control code bus (16) and the end treatment conduit (18) and with an output of the second decoder circuit, a third decoder circuit (36) connected in series with said buffer storage (32) and connectable at an input thereof with the preferential conduit (15) or with the actuation conduit (14) and at an output thereof with a monoflop (34) connected to the buffer storage (32), and a third AND gate (38) connected at an output thereof with the final information conduit (19) and at an input side thereof with said monoflop and said buffer storage.

10. The control system as defined in claim 4, wherein said selection circuit (13) includes a second decoder circuit (33) connected at an input thereof with the intermediate control code bus (16), a buffer storage (32) connected at an input thereof with the intermediate control code bus (16) and the end treatment conduit (18) and with an output of the second decoder circuit, a third decoder circuit (36) connected in series with said buffer sotrage (32) and connectable at an input thereof with the preferential conduit (15) or with the actuation conduit (14) and at an output thereof with a monoflop (34) connected to the buffer storage (32), send a third AND gate (38) connected at an output thereof with the final information conduit (19) and at an input side thereof with said monoflop and said buffer storage.

* * * * *